(12) United States Patent
Wang

(10) Patent No.: US 6,320,499 B1
(45) Date of Patent: Nov. 20, 2001

(54) BRAKE SIGNAL SENSOR DEVICE

(76) Inventor: Ching-Yung Wang, No. 111, Cheng-Nan Street, Ching-Shui Cheng, Taichung Hsien (TW)

( * ) Notice: Subject to any disclaimer, the term of this patent is extended or adjusted under 35 U.S.C. 154(b) by 0 days.

(21) Appl. No.: 09/809,177

(22) Filed: Mar. 16, 2001

(51) Int. Cl.$^7$ ........................................................ B62J 6/00
(52) U.S. Cl. ............................ 340/432; 340/479; 340/464; 74/489; 188/24.22; 200/61.12; 362/72
(58) Field of Search ................................... 340/432, 464, 340/479; 200/61.12, 61.13, 61.14, 61.41, 61.42, 52 R; 188/24.12, 24.21, 24.22; 280/288.4; 362/72, 802; 74/489, 502.2

(56) References Cited

U.S. PATENT DOCUMENTS

| | | | |
|---|---|---|---|
| 4,031,343 | * | 6/1977 | Sopko ................................... 340/432 |
| 4,275,280 | * | 6/1981 | Yamazaki ............................. 340/432 |
| 4,760,372 | * | 7/1988 | Watson ................................. 340/432 |
| 4,896,138 | * | 1/1990 | Nickols ................................ 340/479 |
| 5,739,750 | * | 4/1998 | Drake ................................... 340/479 |
| 5,924,328 | * | 7/1999 | Okajima et al. ....................... 74/489 |

* cited by examiner

Primary Examiner—Daniel J. Wu
(74) Attorney, Agent, or Firm—Rosenberg, Klein & Lee (57) ABSTRACT

The present invention relates to a brake signal sensor device which is electrically connected to a warning light by a transfer wire. The brake signal sensor device includes a body, and a cover mounted on the body. The body defines a receiving chamber for securing a contact switch whose one side is provided with two spaced guide plates. A pull wire is used to pull an elastic member to displace a conducting member, such that the contact switch can produce a start signal which is transferred to the warning light, whereby the warning light secured on the bicycle emits light, thereby enhancing the safety of riding the bicycle. The brake signal sensor device may be easily fixed on the brake cable adjacent to the brake lever by a fastening strap without having to be mounted on the brake pad.

4 Claims, 9 Drawing Sheets

PRIOR ART

FIG.9

PRIOR ART

BRAKE SIGNAL SENSOR DEVICE

BACKGROUND OF THE INVENTION

1. Field of the Invention

The present invention relates to a brake signal sensor device, and more particularly to a brake signal sensor device, wherein a pull wire is pulled to operate a contact switch for starting a warning light, thereby enhancing the safety of riding the bicycle.

2. Description of the Related Prior Art

Figure 8:
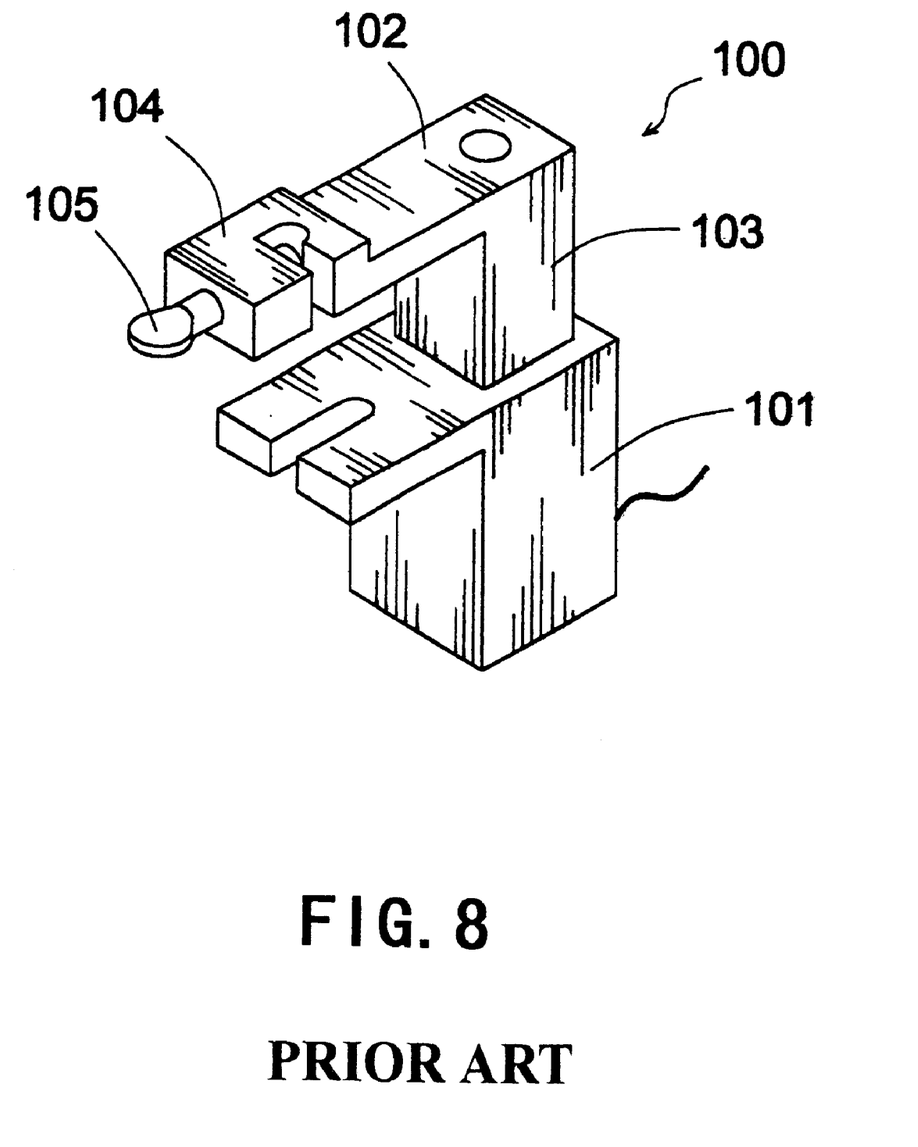
FIG. 8 is a perspective view of a conventional contact switch in accordance with the prior art.
Figure 9:
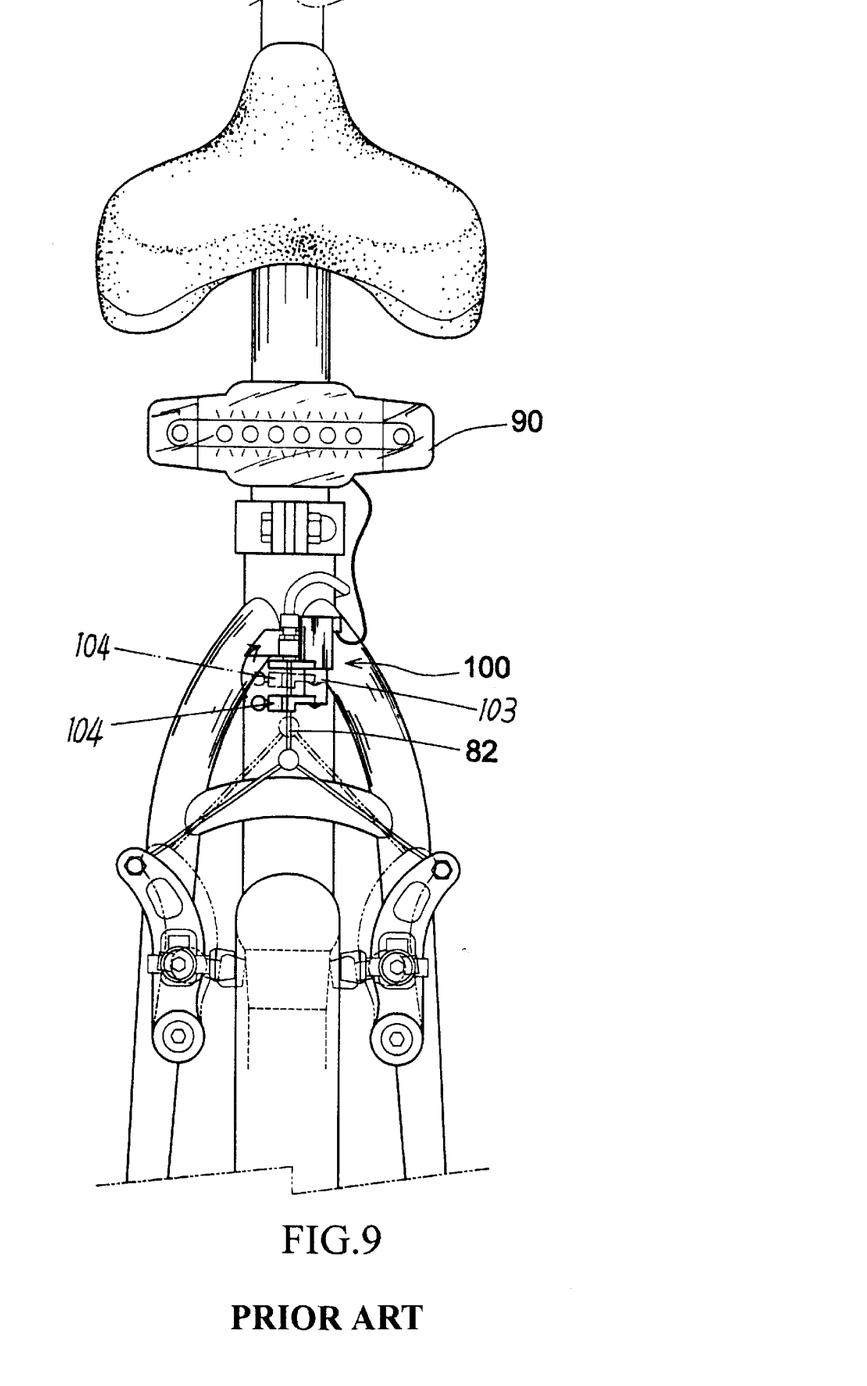
FIG. 9 is, a schematic view showing that the conventional contact switch is mounted on a bicycle.

A conventional contact switch 100 in accordance with the prior art shown in FIGS. 8 and 9 is mounted on a bicycle and comprises a body 101, a press member 102 having a first end formed with a shank 103 slidably mounted in the body 101, and a second end formed with an operation portion 104, and a set screw 105 screwed on the operation portion 104 for positioning the contact switch 100.

In assembly, the operation portion 104 of the press member 102 of the contact switch 100 is secured on the brake wire 82 of the bicycle by the set screw 105. The contact switch 100 is connected with the warning light 90 of the bicycle by a transfer wire. When the bicycle is braked, the brake wire 82 is pulled to press the shank 103 of the press member 102 of the contact switch 100 into the body 101, thereby operating the contact switch 100 to transmit the signal to the warning light 90 so that the warning light 90 can light, thereby providing a warning effect.

However, the operation portion 104 of the press member 102 of the contact switch 100 is disposed at one side of the shank 103, so that when the operation portion 104 of the press member 102 of the contact switch 100 is pulled by the brake wire 82, a rotational moment is exerted on the shank 103 whereby a great friction is generated between the shank 103 and the body 101, thereby easily causing wearing.

In addition, the contact switch 100 is secured on the pull wire 82 which is used for pulling the brake pad. When the brake pad is worn out, the user has to adjust the tightness of the brake wire 82. The contact switch 100 secured on the pull wire 82 occupies a large space of the pull wire 82, so that the adjustable extent of the pull wire 82 is greatly limited.

SUMMARY OF THE INVENTION

The present invention has arisen to mitigate and/or obviate the disadvantage of the conventional contact switch.

In accordance with the present invention, there is provided a brake signal sensor device comprising a body, and a cover mounted on the body, wherein:

the body has a top face whose center defines an elongated receiving chamber;

a contact switch is secured in the receiving chamber of the body and is electrically connected to a warning light, the contact switch is provided with a positioning portion which is secured in the receiving chamber of the body, the positioning portion of the contact switch has one side provided with two spaced guide plates;

a conducting member is slidably mounted in the receiving chamber of the body and faces the two guide plates of the positioning portion;

a first elastic member is extended through the positioning portion of the contact switch and is urged on a first side of the conducting member such that the conducting member is spaced from the two guide plates of the positioning portion;

a second elastic member has a first end urged on a second side of the conducting member;

a press member is secured on a second end of the second elastic member; and a pull wire has a first end attached to the press member and a second end extended through the second elastic member, the conducting member, the first elastic member, and the positioning portion, and extended outward from the body.

The body has a bottom defining a channel extended through an entire length of the body.

The cover has a top face defining at least one transverse trench.

The positioning portion of the contact switch has the other side secured with a socket which protrudes outward from a top face of the cover.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a brake signal sensor device 1 in accordance with a first embodiment of the present invention is mounted on a bicycle. By operation of the brake signal sensor device 1, the warning light 90 secured on the bicycle will light, thereby achieving a warning effect during the braking process of the bicycle.

The brake signal sensor device 1 primarily comprises a body 10, a cover 20 mounted on the body 1 0, and a contact switch 30 secured in the body 10.

Figure 2:
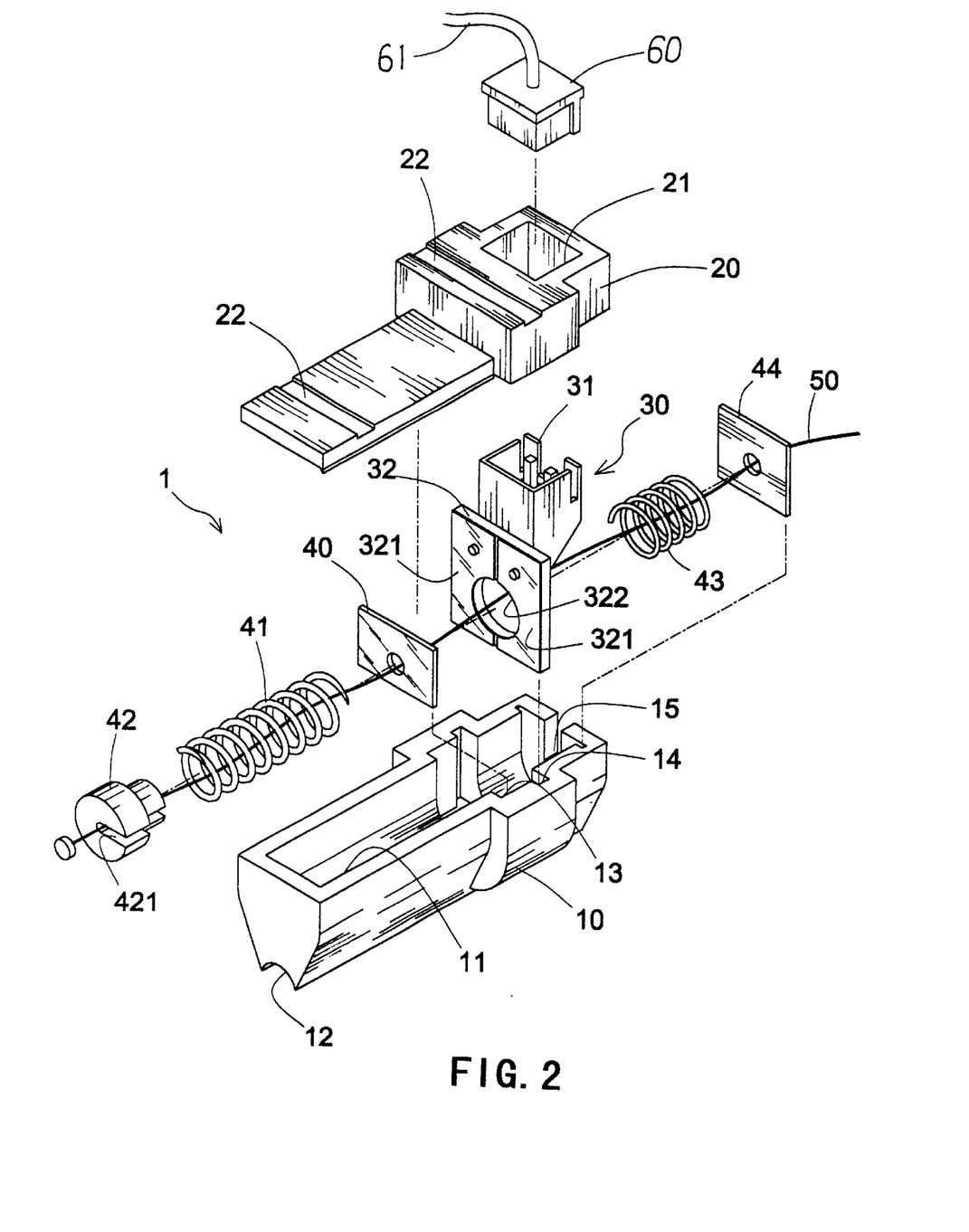
FIG. 2 is an exploded perspective view of a brake signal sensor device in accordance with a first embodiment of the present invention.
Figure 3:
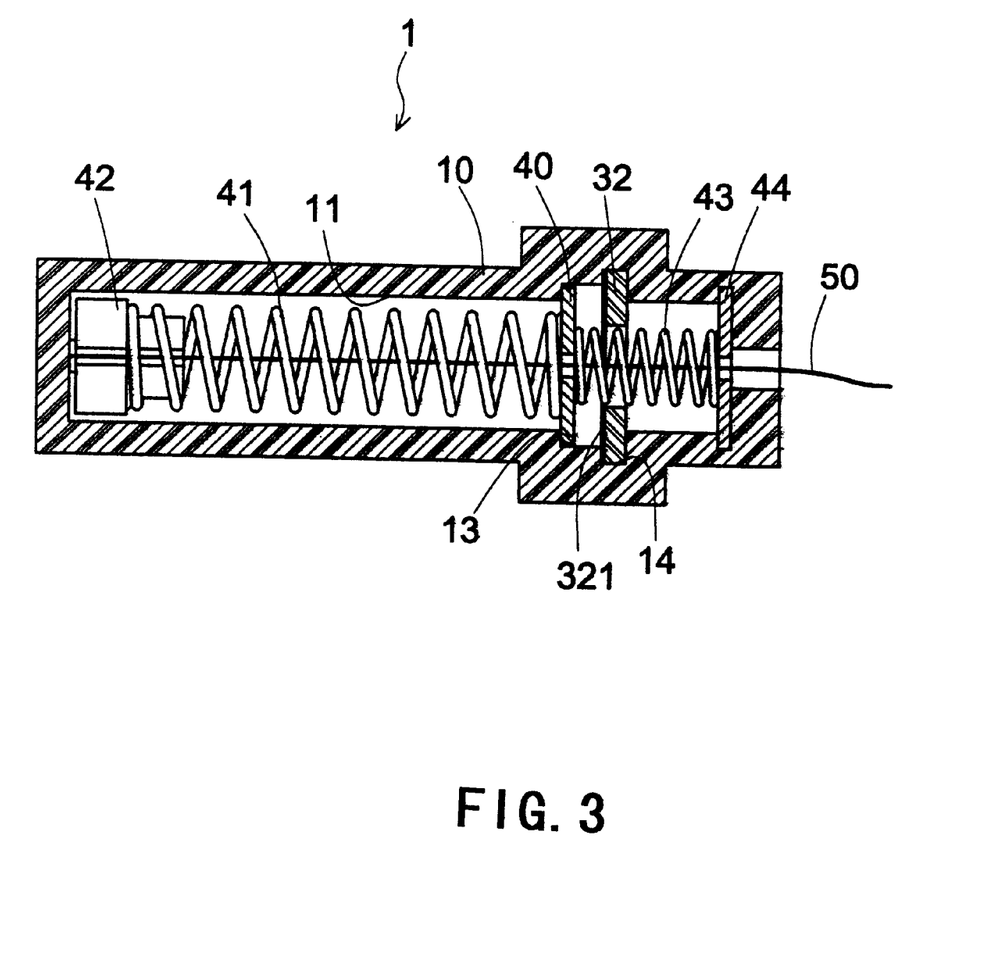
FIG. 3 is a front plan cross-sectional assembly view of the brake signal sensor device as shown in FIG. 2.

The body 10 has a bottom defining a channel 12 extended through the entire length of the body 10. The body 10 has a top face whose center defines an elongated receiving chamber 11. A slide groove 13 is defined in the receiving chamber 11, and has a width greater than that of the receiving chamber 11. An insertion groove 14 is defined in the receiving chamber 11, and has a width greater than that of the slide groove 13. The body 10 has a distal end defining a cutout 15 communicating with the receiving chamber 11.

The contact switch 30 is secured in the receiving chamber 11 of the body 10 and is electrically connected to the warning light 90. The contact switch 30 is provided with a positioning portion 32 secured in the insertion groove 14 of the receiving chamber 11 of the body 10. The positioning portion 32 of the contact switch 30 has a first side provided with two spaced guide plates 321 and a second side secured with a socket 31 which protrudes outward from the top face of the cover 20. Each of the two guide plates 321 is connected to the socket 31 respectively.

A conducting member 40 made of electrically conducting material is slidably mounted in the slide groove 13 of the receiving chamber 11 of the body 10 and faces the two guide plates 321 of the positioning portion 32.

A first elastic member 43 is extended through a through hole 322 defined in the positioning portion 32 of the contact switch 30 and has a first end urged on an abutting plate 44 that is secured in the receiving chamber 11 of the body 10, and a second end urged on a first side of the conducting member 40 such that the conducting member 40 is spaced from the two guide plates 321 of the positioning portion 32 with a determined distance by the elastic force of the first elastic member 43.

A second elastic member 41 has a first end urged on a second side of the conducting member 40. The elastic force of the second elastic member 41 is greater than that of the first elastic member 43. A press member 42 is secured on a second end of the second elastic member 41 and is rested on an inner wall of the receiving chamber 11 of the body 10.

A pull wire 50 has a first end attached to the press member 42 through a slit 421 defined in the press member 42 and a second end in turn extended through the second elastic member 41, the conducting member 40, the first elastic member 43, and the positioning portion 32, and extended outward from the body 10 through the cutout 15.

Figure 1:
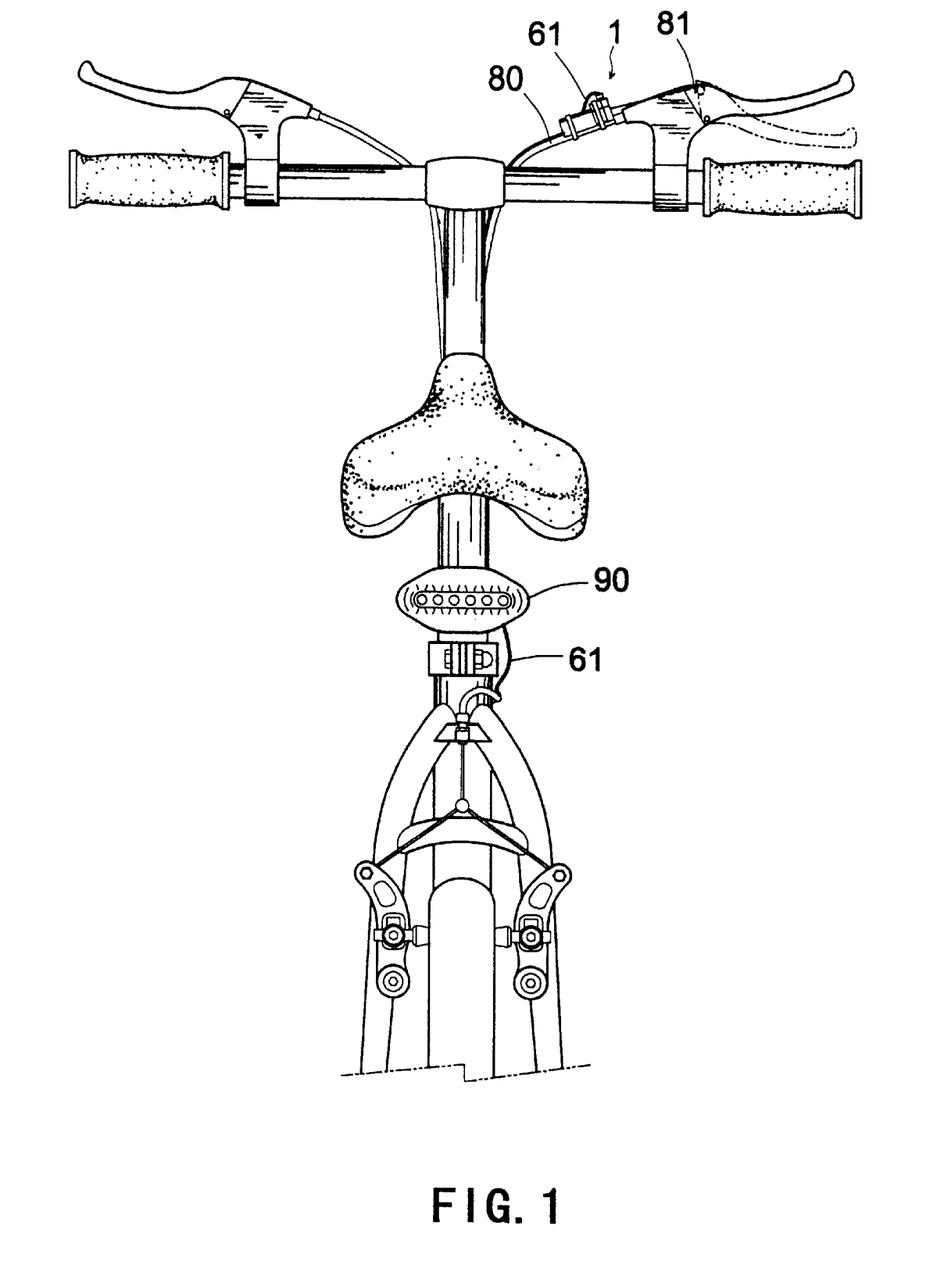
FIG. 1 is a schematic view of a brake signal sensor device in accordance with the present invention.
Figure 4:
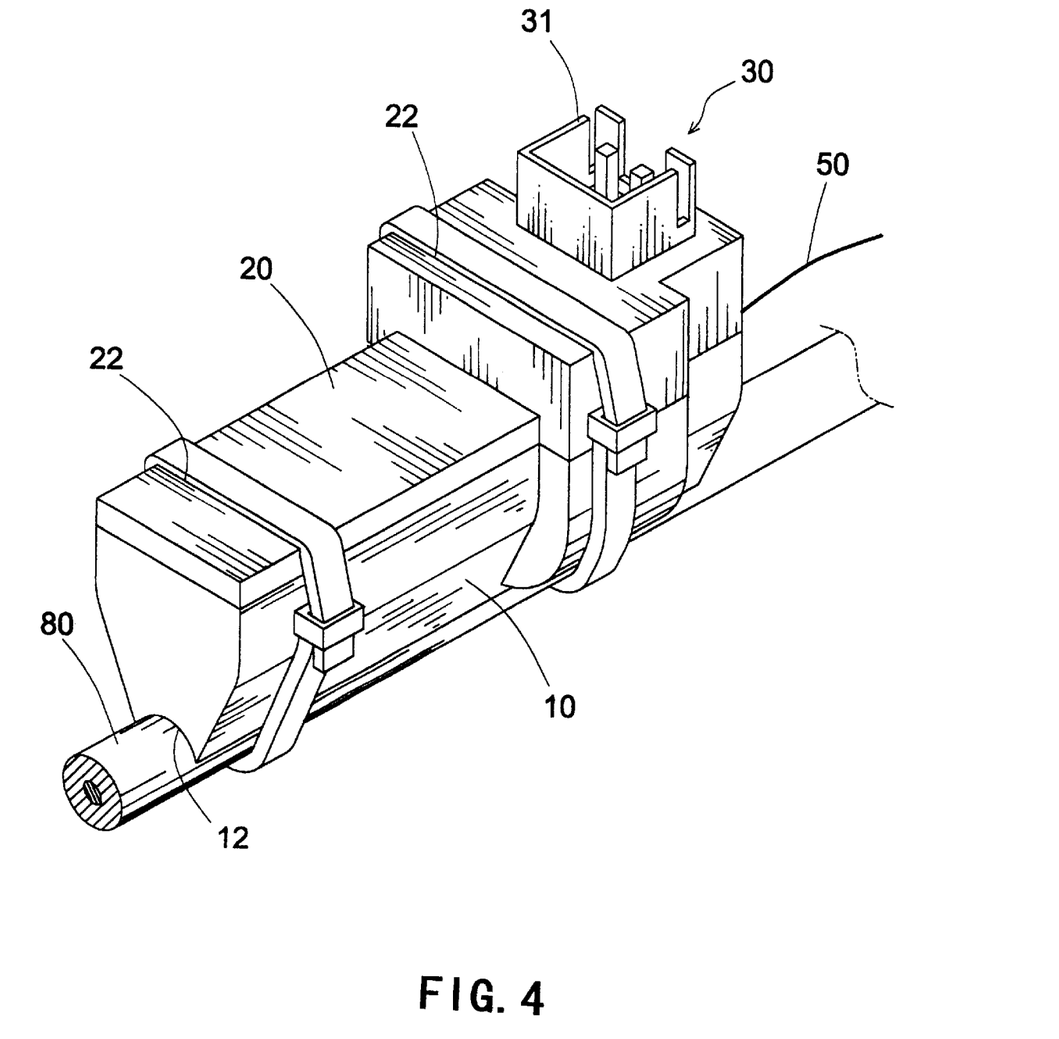
FIG. 4 is a perspective assembly view of the brake signal sensor device as shown in FIG. 2.

The cover 20 mounted on the body 10 defines a receiving hole 21 for receiving the socket 31, and defines a plurality of transverse trenches 22 for mounting a plurality of fastening straps 70. A plug 60 is inserted into the socket 60, and a transfer wire 61 has a first end attached to the plug 60 and a second end attached to the warning light 90 such that the warning light 90 is electrically connected with the contact switch 30. The channel 12 defined in the bottom of the body 10 is rested on the rim of the brake cable 80, and the fastening straps 70 can be used to fasten the brake signal sensor device 1 with the brake cable 80 of the brake lever 81 together as shown in FIGS. 1, 4 and 5.

Figure 5:
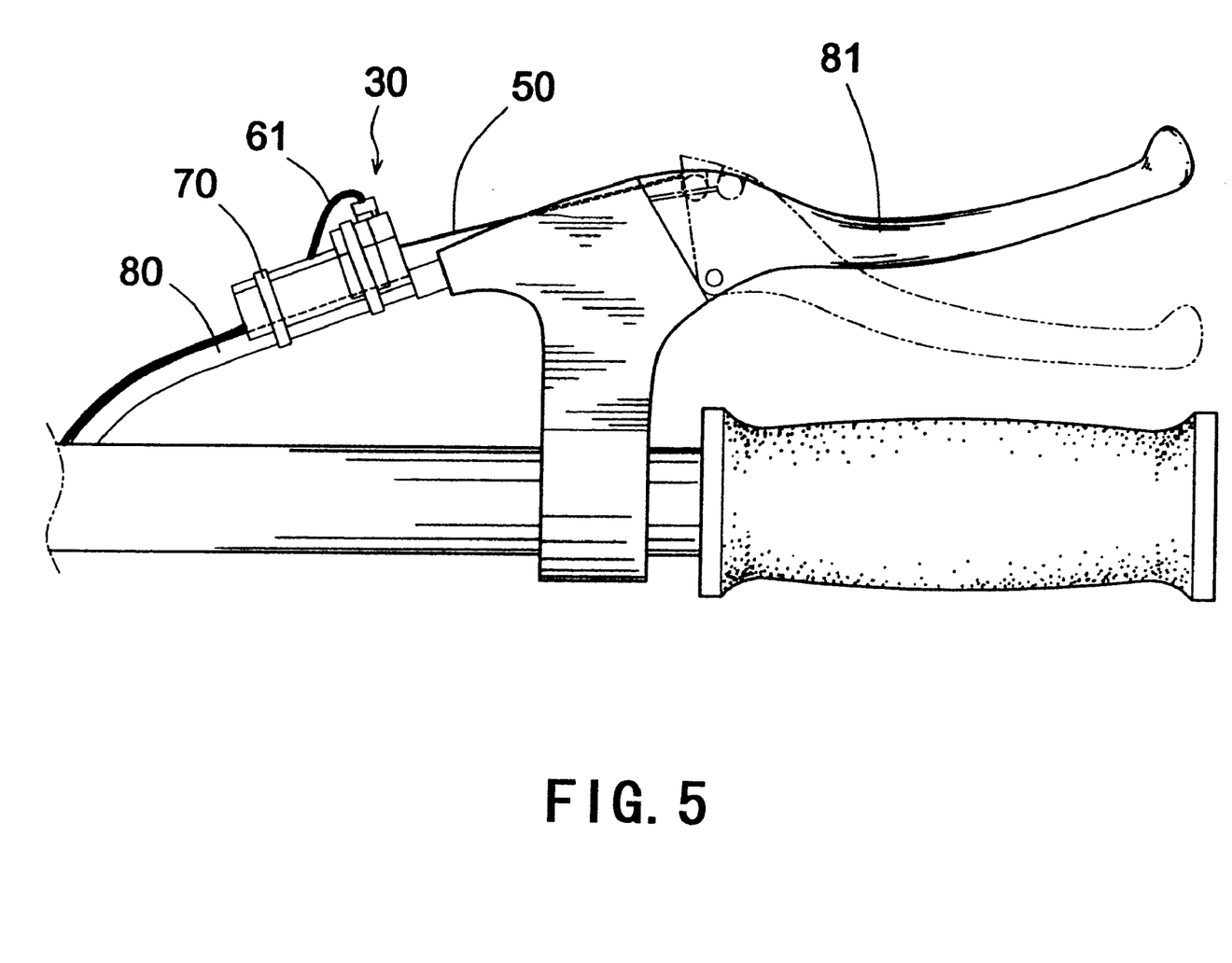
FIG. 5 is a schematic view showing that the brake signal sensor device is connected to a brake lever.
Figure 6:
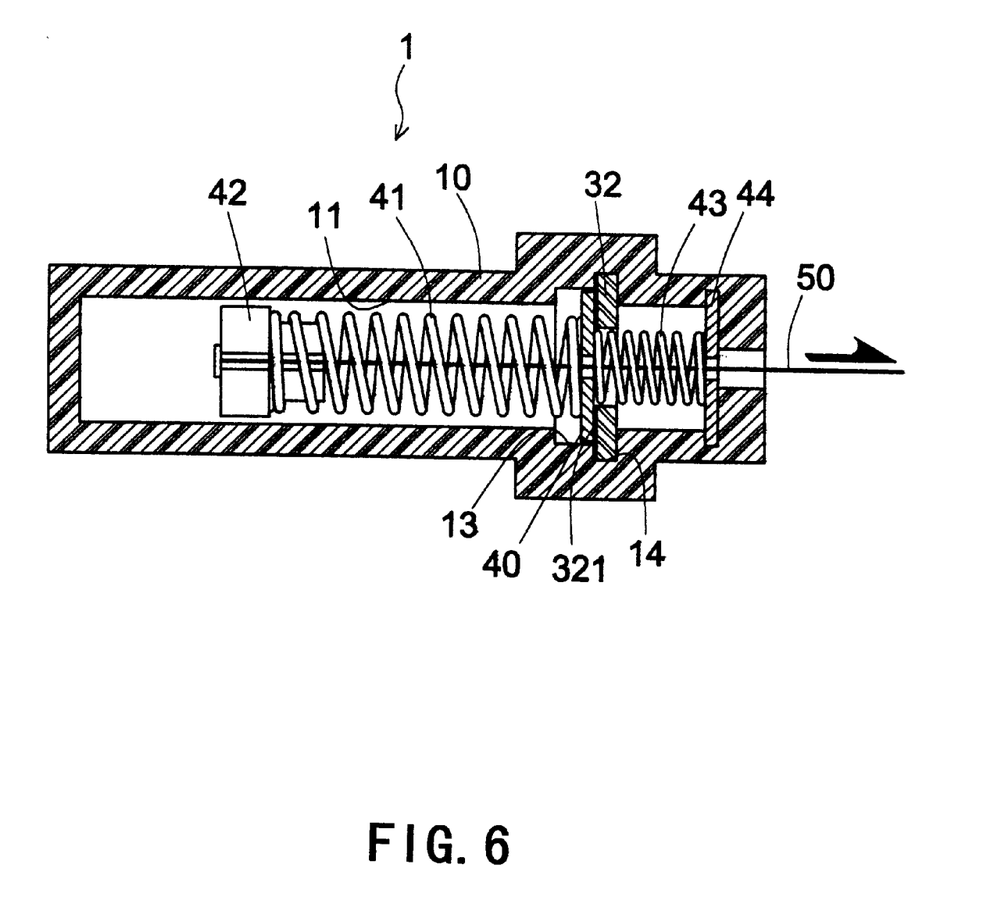
FIG. 6 is a schematic operational view of the brake signal sensor device as shown in FIG. 3 in use.

In operation, referring to FIGS. 1–6, the distal end of the pull wire 50 is secured to the brake lever 81 as shown in FIG. 5, such that when the brake lever 81 is operated, the pull wire 50 can be pulled by the brake lever 81. When the rider exerts a force on the brake lever 81 for braking the movement of the bicycle, the pull wire 50 can be pulled by the brake lever 81 to pull the press member 42 to displace toward the conducting member 40 as shown in FIG. 6, such that the second elastic member 41 is urged by the press member 42 so as to press the conducting member 40. The elastic force of the second elastic member 41 is greater than that of the first elastic member 43, such that the conducting member 40 is displaced to contact with the two guide plates 321 of the positioning portion 32, thereby forming connection of the two guide plates 321, such that the contact switch 30 generates a connection signal which is then transmitted to the warning light 90 through the transfer wire 61, thereby greatly enhancing the safety of riding the bicycle.

Figure 7:
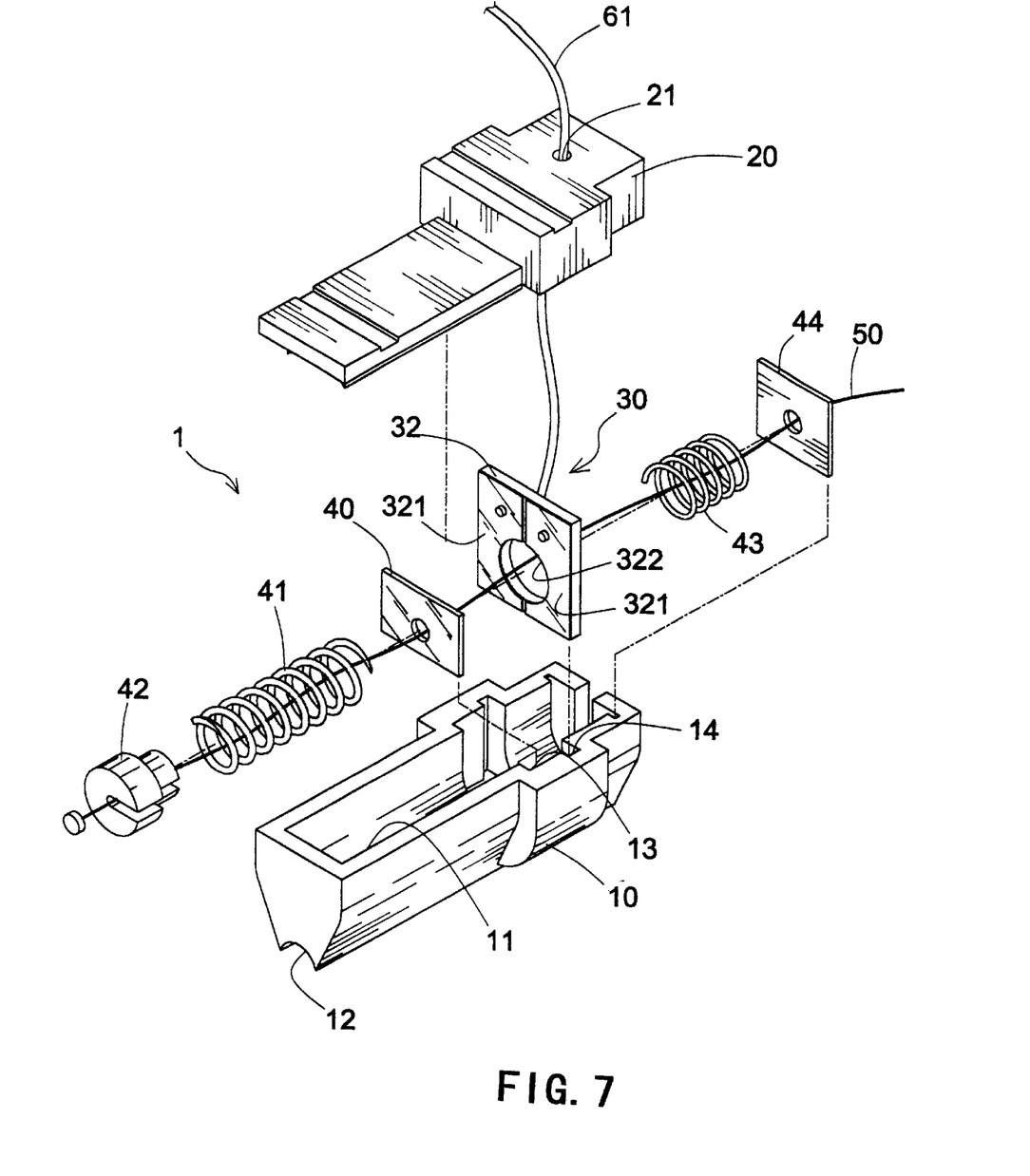
FIG. 7 is an exploded perspective view of a brake signal sensor device in accordance with a second embodiment of the present invention.

Referring to FIG. 7, in accordance with a second embodiment of the present invention, one end of the transfer wire 61 is extended through the receiving hole 21 of the cover 20, and is directly secured to the positioning portion 32 of the contact switch 30. The other end of the transfer wire 61 is secured to the warning light 90.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A brake signal sensor device comprising a body (10), and a cover (20) mounted on said body (10), wherein:

said body (10) has a top face whose center defines an elongated receiving chamber (11);

a contact switch (30) is secured in said receiving chamber (11) of said body (10) and is electrically connected to a warning light (90), said contact switch (30) is provided with a positioning portion (32) which is secured in said receiving chamber (11) of said body (10), said positioning portion (32) of said contact switch (30) has one side provided with two spaced guide plates (321);

a conducting member (40) is slidably mounted in said receiving chamber (11) of said body (10) and faces said two guide plates (321) of said positioning portion (32);

a first elastic member (43) is extended through said positioning portion (32) of said contact switch (30) and is urged on a first side of said conducting member (40) such that said conducting member (40) is spaced from said two guide plates (321) of said positioning portion (32);

a second elastic member (41) has a first end urged on a second side of said conducting member (40);

a press member (42) is secured on a second end of said second elastic member (41); and a pull wire (50) has a first end attached to said press member (42) and a second end extended through said second elastic member (41), said conducting member (40), said first elastic member (43), and said positioning portion (32), and extended outward from said body (10).

2. The brake signal sensor device in accordance with claim 1, wherein said body (10) has a bottom defining a channel (12) extended through an entire length of said body (10).

3. The brake signal sensor device in accordance with claim 1, wherein said cover (20) has a top face defining at least one transverse trench (22).

4. The brake signal sensor device in accordance with claim 1, wherein said positioning portion (32) of said contact switch (30) has the other side secured with a socket (31) which protrudes outward from a top face of said cover (20).

* * * * *